Figure 2:
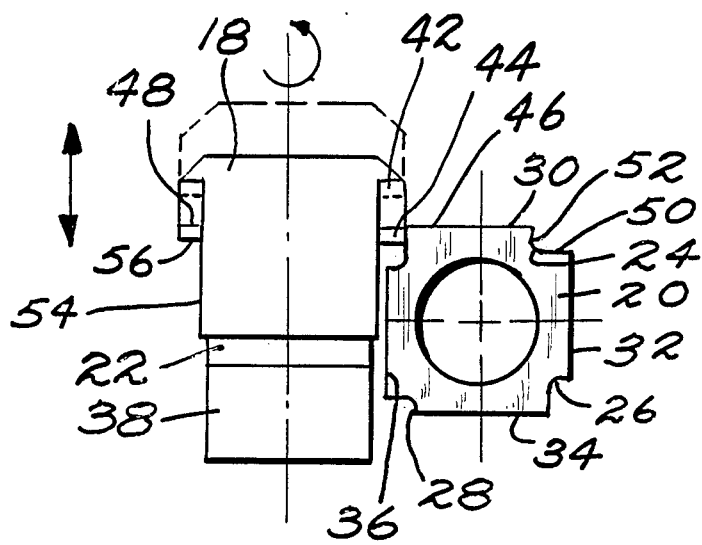

United States Patent [19]

Niebuhr

[11] Patent Number: 4,736,881

[45] Date of Patent: * Apr. 12, 1988

[54] APPARATUS FOR JOINING TWO ELECTRIC CONDUCTORS

[75] Inventor: Freidrich W. Niebuhr, Aschaffenburg, Fed. Rep. of Germany

[73] Assignee: Niebuhr Ultraschalltechnik GmbH, Aschaffenburg, Fed. Rep. of Germany

[*] Notice: The portion of the term of this patent subsequent to Jun. 12, 2002 has been disclaimed.

[21] Appl. No.: 452,408

[22] Filed: Dec. 22, 1982

[30] Foreign Application Priority Data

Dec. 23, 1981 [DE] Fed. Rep. of Germany ....... 3151151

[51] Int. Cl.$^4$ .............................................. B23K 20/10
[52] U.S. Cl. ..................................... 228/1.1; 228/110
[58] Field of Search ........................ 228/1 B, 1 R, 110

[56] References Cited

U.S. PATENT DOCUMENTS

| 3,426,951 | 2/1969 | Pohlman et al. | 228/1 |
| 3,440,118 | 4/1969 | Obeda | 228/1 |
| 3,813,006 | 5/1974 | Holze, Jr. et al. | 228/1 R |
| 3,822,465 | 7/1974 | Frankort et al. | 228/1 X |

FOREIGN PATENT DOCUMENTS 2641508 9/1976 Fed. Rep. of Germany.

Primary Examiner—Nicholas P. Godici
Assistant Examiner—P. Weston Musselman, Jr.
Attorney, Agent, or Firm—Cushman, Darby & Cushman

[57] ABSTRACT

An apparatus for joining of two electric conductors, preferably strands or the like, with an easy adaptation to different conductor sizes without having to cover the conductors to be joined with a sleeve. The apparatus comprises a sonotrode (58) generating ultrasonic oscillations, as well as at least one serving as an anvil (60, 62), where the sonotrode on its circumferential surface has at least one recess (68, 70 76, 78) being adapted to conductors to be joined, which recess is starting fron a lateral face of the sonotrode along which an area (76, 78) of the anvil can be moved, said area having a projection (72, 74) adapted to the recess, and where in the position of sonotrode and anvil for joining the conductors, the recess and the coordinated projection are defining a hollow space representing a compression chamber, running parallel or almost parallel to the oscillation axis of the sonotrode and being open on its front faces for inserting the conductors.

11 Claims, 3 Drawing Sheets

APPARATUS FOR JOINING TWO ELECTRIC CONDUCTORS

The invention relates to an apparatus for joining two electric conductors, preferably strands or the like, comprising a sonotrode generating sound vibrations or, respectively, ultrasonic oscillations, as well as at least one counter electrode serving as an anvil.

In order to join two electric conductors, the joining point is usually covered by a sleeve, in order to crimp said sleeve to the conductors and eventually subsequently weld them. This can be effected e.g. by means of soldering, resistance welding or ultrasonic welding. The fundamental disadvantage of these methods is that the assembly requires a lot of time since the conductor ends must first be inserted in the sleeve in order to subsequently make a tight connection.

The German application No. 26 41 508 describes an apparatus for joining electric conductors like strands with a metallic support, where the electric conductor is inserted in a counter electrode designed as an anvil of an ultrasonic welding apparatus. Then the electric support to be joined with the conductor is placed on the anvil for subsequently moving the sonotrode in direction of the anvil. In order to be able to join the support with conductors of different diameters, the anvil is provided with spring-actuated movable slides down to which the sonotrode can be lowered. Thereby the space between the slides is always smaller than the corresponding extension of the adjacent sonotrode areas.

It is the object of the present invention to design an apparatus of the kind mentioned at the beginning in such a manner as to enable an unproblematic, inexpensive and economical joining of two electric conductors, preferably strands or the like, without having to cover the conductors to be joined with a sleeve, where in addition an easy adaption to different conductor dimensions shall be provided.

According to the invention this object is realized in that the sonotrode or, respectively, the head of the sonotrode, on its circumferential area has at least one recess adapted to conductors to be joined, starting from a lateral face of the sonotrode or, resp. head of the sonotrode, on which an area of the anvil provided with a projecting part being adapted to the recess can be displaced in such a manner that in welding position the recess and the corresponding projection define a cavity representing a compression chamber, extending parallelly or almost parallelly to the sonotrode's axis of oscillation, said chamber being open on its front face for leading-in the conductors. Thereby, of course, the projecting part and the recess are adapted to each other in such a manner that reciprocal action with the sonotrode head takes place, whereby finally the welding is effected.

Consequently according to the invention's teaching, the conductors to be joined merely must be placed in the compression chamber in order to be subsequently joined. Preferably the conductors going to be joined are placed into the recess of the sonotrode when the anvil is raised, however, without removing its surface corresponding to the lateral face from said lateral face, and then the anvil is lowered so far that the projection will act reciprocally with the recess in such a manner as to form the compression chamber or, resp. hollow space in order to subsequently be able to set the sonotrode vibrating.

Since as mentioned above, even the raised anvil with its surface having the projection is bordering on the lateral face having the recess, the placing of the conductor ends into the recesses is facilitated as the anvil in a way plays the part of a guiding assistance.

In an especially preferred embodiment of the invention the sonotrode or, resp. head of the sonotrode comprises lateral faces defining a polygon, levelly running and representing the circumferential area, in the intersecting points of which recesses of preferably different dimensions are arranged. Thus on the periphery of the sonotrode or, resp. head of the sonotrode, there is a plurality of recesses acting reciprocally with the corresponding projections in order to provide compression chambers of different dimensions for conductors of different diameters.

The following teaching can be called an autoinventive embodiment of the invention, to-wit: that each time two lateral faces of the sonotrode or, resp. the head of the sonotrode are running parallel to each other, along which in each case one anvil with projections can be moved preferably synchronously to each other, said projections being adapted to the corresponding recesses. This suggestion according to the invention offers the possibility of separately placing conductors each time in opposite sonotrode recesses bordering on corresponding anvils, in order to make two joining points at the same time in one phase of operation. It is obvious that a corresponding device for automatization of the joining of two conductors can likewise be used.

Preferably each anvil has areas movable along lateral faces of sonotrodes and provided with several different projecting parts. Thereby the chance as mentioned already in the foregoing, is given that due to the different projections one can also weld different conductor sizes to each other without having to use different anvils for each conductor size. In order to be able to coordinate the desired projection with a specified recess, according to an embodiment of the invention the anvil is pivoted on its main axis running parallel to the direction of displacement. Likewise the sonotrode is arranged to revolve along its main axis so that the characterization "revolving sonotrode" should be correct.

The recesses adapted to the dimensions of the conductors to be joined are preferably limited by two flanges extending in the direction of the sonotrode's longitudinal axis, of which the flange being arranged in stagger to the coordinated lateral face is running parallel to that face and where the flange starting from the lateral face is describing an angle of 90° or less relative to it, the passage between the flanges preferably being round like e.g. concave. Especially if the angle between the flanges is less than 90° it is guaranteed that the inserted conductor ends cannot slip out. By the round passage between the flanges it is guaranteed that the welded final product will not have any sharp edges.

In order to give the joining point of welded conductors an especially high stability, in a further embodiment of the invention being particularly worth mentioning, that section (flange) of the recess running parallelly to the coordinated lateral face is structured by alternately arranged elevations and excavations parallel to the displacement direction of the anvil moving along the lateral face for defining so-called channels, which e.g. can be cut in by spark erosion.

The projections arranged at the anvil, on the other hands, are preferably formed by one step each, of which a (first) section is corresponding to the area being movable along a lateral face of the sonotrode or, respectively, is starting from that area, and the other (second) section is describing an angle of preferably 90° relative thereto, where the lateral extension of the second section from the first section is equal or smaller than the depth of the recesses of the sonotrode to be coordinated. Further that area of the anvil being movable along the lateral face of the sonotrode should be made of hardened material in order to prevent an all too soon wear and tear.

Finally the direction of motion of the anvil or, resp. anvils relative to the direction of oscillation of the sonotrode can describe an angle of 90°±20°, where this angle is conditional on, among others, the material of the conductors to be welded.

Figure 1:
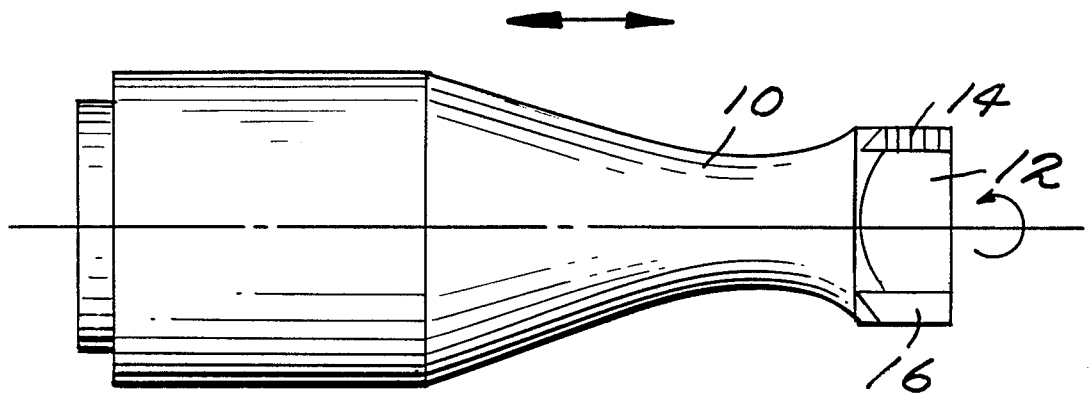
Figure 3:
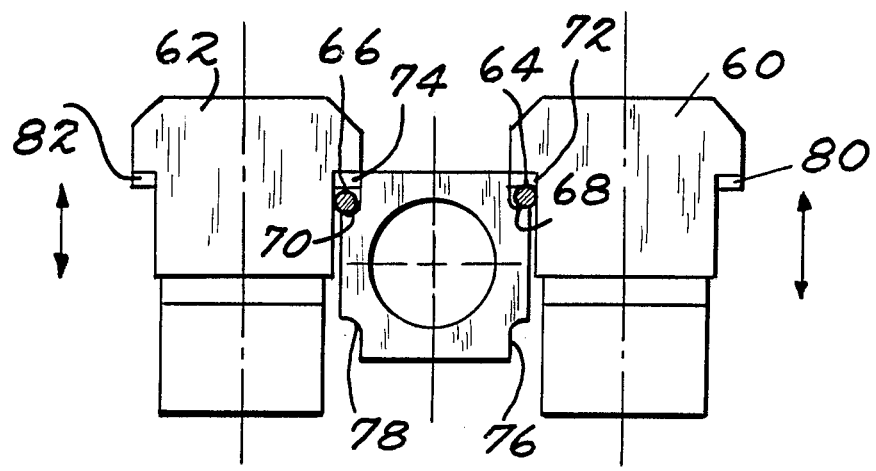
Figure 4:
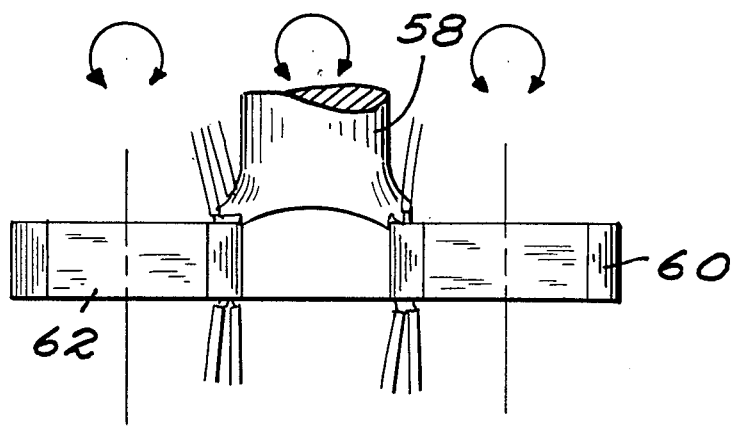
Figure 5:
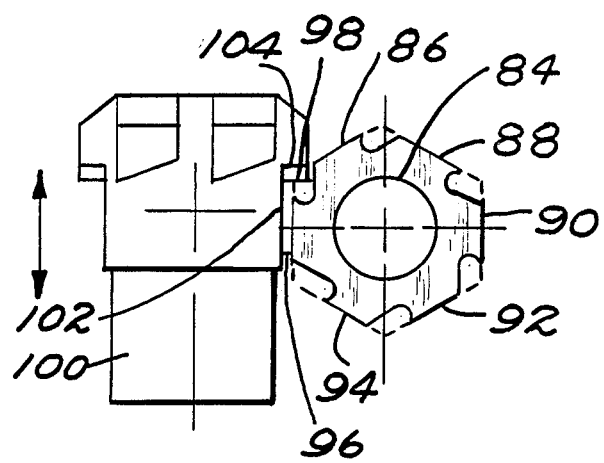
Figure 6:
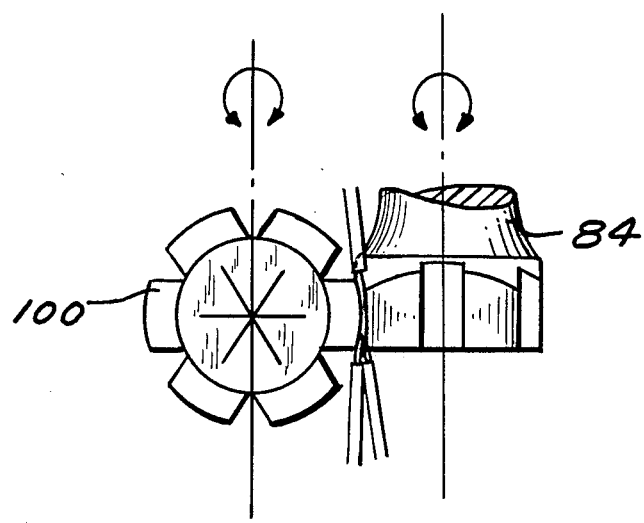

Further details, advantages and characteristics of the invention will follow from the preferred examples of embodiment represented in the attached drawing, where FIG. 1 is a side view of a sonotrode constructed according to the invention, FIG. 2 is a front view of a first embodiment of an apparatus according to the invention, FIG. 3 is a front view of a second embodiment, FIG. 4 is a top view of the embodiment according to FIG. 3, FIG. 5 is a front view of another embodiment, and FIG. 6 is a top view of the embodiment according to FIG. 5.

FIG. 1 represents the side view of a sonotrode 10 comprising a sonotrode head 12 having on its peripheral surface the recesses 14 and 16, of which the design and performance will be described in detail in connection with FIGS. 2 to 6.

The sonotrode 10 in longitudinal direction is set vibrating to generate sound or, resp. ultrasonic vibrations, in order to join electric conductors with each other that were placed in the recesses 14 and 16. To this end the sonotrode 10 must be coordinated with a counter electrode, which is also called an anvil. The electric conductors are then placed between anvil and sonotrode 10 in order to form welded joining points.

FIG. 2 shows an embodiment where a sonotrode 20 is arranged relative to an anvil 18 in order to be able to make the desired welding. Thus the sonotrode 20 or, resp. the corresponding sonotrode head, on its peripheral surface has four recesses 22, 24, 26 and 28, being positioned at the intersecting points of evenly extending lateral faces 30, 32, 34 and 36 defining the circumferential area. In other words, the cross section of the sonotrode head 20 forms a square, of which the corners are replaced by the recesses 22, 24, 26 and 28. The anvil 18 is designed in such a manner that it has an even area 38 being movable along the lateral face 36. Further the recess 22 is coordinated with a projecting part 42 so that after the conductors having been inserted (indicated by strands 44 in FIG. 2), the projecting part 42 and the coordinated recess 22 together will form a compression chamber 46.

Now for welding the conductors together, the following operating process takes place:

At first the anvil 18 is in a raised position (shown by broken line), so that the conductors can be placed into the recess 22, where the area 38 of the anvil 18 being movable along the lateral face 36 of the sonotrode 20 serves simultaneously as a guiding way. As soon as the conductors are inserted in the recess 22, the anvil is lowered in direction to the sonotrode so far (shown by unbroken lines) that the space remaining between projection 42 and recess 22 provides the necessary compression chamber 46. Thereafter the sonotrode 10 is set vibrating for a period that can be within the range of the tenth of a second, for welding the conductors together in order to make the joining point in this manner. Subsequently the anvil 18 is lifted again in order to be able to remove the welded conductors.

To enable a firm welding together also of conductors of different diameters with one and the same sonotrode and only one anvil, the recesses 22 to 28 are being designed with different depths or, resp. heights. At the same time the anvil has a further projection 48 in addition to the projection 42 in the embodiment example of FIG. 2, which projections can differ from each other with respect to their outward-directed extension or in regard to the height they were moved into relative to the welding position of the anvil 18. To this end the anvil 18 and the sonotrode each are arranged for turning on their longitudinal axis (indicated by arrows).

In the embodiment example of FIG. 2, the anvil's cross section is T-shaped and in top view of oblong design; however, it goes without saying that four different projections can be coordinated to the recesses 22, 24, 26, 28 so that the corresponding anvil in top view defines a cross.

As to the recesses it must be noted that these are limited by flanges 50 and 52 running in longitudinal direction of the sonotrode (shown as an example at recess 24), of which that flange being arranged in stagger to the coordinated lateral face 30 along which the anvil is being displaced, is running parallel to the lateral face 30, whereas the flange 52 extending from said face is running right-angled or acute-angled in direction to the center of the sonotrode. Further the passage between the flanges 50 and 52 is of concave design in order to enable an easy insertion of the conductors to be joined. In other words, the cross section of the recess 24 is preferably defining a "J".

Each projection 42 or, resp. 48 of the anvil 18 is formed by a step, of which one section 54 corresponds to the area movable along a lateral face of the sonotrode 20 or, respectively, is the extension of that area, and of which the other section 56 describes an angle of preferably 90° thereto, where the lateral extension of the section 56 from the area 54 is equal to or smaller than the depth of the coordinating recess of the sonotrode 20. Further the section 56 is running parallel to the longitudinal axis of the sonotrode.

Still another embodiment of the recesses of the sonotrode head is shown in FIG. 1. In order to give the joining point of the combined conductors special stability, the flange running parallel to the lateral face or, respectively, to that area of the anvil being movable along said lateral face (in the embodiment example of FIG. 2 the flange 50 of the recess 24) has a chamfered structure, which chamfers on their part are running vertically to the direction of oscillation of the sonotrode. These chamfers then will press themselves into the conductors at the joining point, thus providing the mentioned stabilizing effect and increased strength.

FIG. 3 shows another especially outstanding embodiment of the apparatus according to the invention, where a sonotrode 58 or, resp. the head of the sonotrode is surrounded by two anvils 60 and 62, in order to be able to weld together several conductors placed in different recesses at the same time in a single operation. Concerning the design of the recesses of the sonotrode 58 or, respectively, of the projections of the anvils 60 and 62, please be referred to the explanations in connection with FIGS. 1 and 2.

The embodiment example according to FIGS. 3 and 4 is now offering facility for placing conductors into two compression chambers, to-wit: the chambers 64 and 66, being defined by coordinated recesses 68 or, resp. 70 or resp. projections 72 and 74. in order to form at the same time two joining points on different conductors in a single operation. To this end the anvils 60 and 62 are lifted (not shown), in order to be able to place or, resp. insert the electric conductors, preferably of the stranded type, into the recesses 64 and 66 after having been led through those areas 76 or, resp. 78 of the anvils 60 and 62 facing the sonotrode and being movable along the same. Subsequently the anvils 60 and 62 are lowered synchronously in order to form the mentioned compression chambers 64 and 66. Thereafter the sonotrode is set vibrating in longitudinal direction for completing the welding operation after a tenth of seconds.

For having attached to it the two anvils 60, 62, the sonotrode 58 can also be called a tandem sonotrode, where contrary to the embodiment example of FIG. 2, the recesses 68 and 70 are not made in the same direction to a center line but rather opposite—quasi symmetrically—thereto, as said recesses at the same time are reciprocally acting with one projection each (72 or, resp. 74) of the anvils 60 or, resp. 62.

In addition to the projections 68 and 70 the tandem sonotrode 58 has two further projections 76 and 78, which as to their dimensions can be differ from the first mentioned ones, in order to be able to weld with a single sonotrode notwithstanding the conductor sizes. Analogous to the different design of the recesses, the anvils 60 and 62, in addition to the projections 72 and 74, have additional projections 80 and 82, which likewise can have different dimensions.

In order to make the different projections work together with different recesses, the anvils 60 and 62 as well as the sonotrode 58 are likewise arranged for turning round their longitudinal axis.

If now according to the embodiment examples of FIGS. 1 to 4 a total of 4 recesses are arranged on the circumferential surfaces of the sonotrode, thus the sonotrode, in top view, being essentially of square configuration, it is likewise possible to provide more than four recesses—as shown by the embodiments in FIGS. 5 and 6—in order to offer a still greater variability and mode of application, thus making available even larger bandwidth for conductors of different size to be welded.

Thus the lateral faces 86, 88, 90, 92, 94, 96 constituting the circumferential surface of the sonotrode 84, are defining a hexagon, in the corners of which recesses are arranged. One of these recesses, for example, will be marked with the reference figure 98. In this embodiment example now each recess is coordinated with a special projection of an anvil 100 so that the same will have a total of six projections, starting each time from an area and being movable along one of the lateral faces 86 to 96 of the sonotrode 84, either vertically or almost vertically to the longitudinal axis of the sonotrode. In the embodiment example the lateral face 96 of the sonotrode 84 is coordinated with the area 102 ending in the projection 104 which is adapted to the recess 98 in order to form a desired compression chamber into which ends of conductors have been placed to be subsequently welded together. Since only one anvil 100 is attached to the sonotrode 84, the recesses again are made to be in the same sense of rotation.

If a total of 2 anvils should be attached to a sonotrode having more than four recesses, then the number of recesses should correspond to a multiple of four, where then two adjacent recesses must be made opposite to each other, thus perhaps having a certain symmetry with regard to the center lines formed between them.

The sonotrode of the embodiment example of FIGS. 5 and 6 can also be called a revolver sonotrode due to the plurality of the recesses on the circumferential surface of same and its turning round the longitudinal axis. Accordingly the anvil 100 can be called revolver anvil.

I claim:

1. An apparatus for joining at least two electric conductors as strands comprising a sonotrode generating sound vibrations as ultrasonic oscillations, and at least one anvil, wherein said sonotrode on its side surface has at least one recess for receiving said conductors, said recess extending along a lateral face of said sonotrode, a projection means on said anvil adapted to interfit with said recess; for projection defining a cavity serving as a compression chamber, extending substantially parallel to the oscillation axis of said sonotrode, said cavity being open at opposite ends for allowing said conductors to extend out of said cavity and means to move said anvil laterally relative to said lateral face of said sonotrode to compress said electric conductors.

2. An apparatus according to claim 1, wherein said sonotrode comprises a plurality of lateral faces defining a polygon at the intersections of said faces, there being located a said recess.

3. An apparatus according to claim 2, wherein two movable anvils are provided on opposite sides of said sonotrode, each anvil having a projection located so that each is movable into an associated recess synchronously.

4. Apparatus according to claim 1, whereby said anvil has a portion movable relative to said lateral face of said sonotrode, said portion having several projections.

5. Apparatus according to claim 1, wherein said anvil is rotatable on its main axis, which extends parallel to the direction said anvil moves relative to said lateral face of said sonotrode.

6. Apparatus according to claim 1, wherein said recess extends along two intersecting lateral faces of said sonotrode such that said recess has two side walls extending parallel to the longitudinal axis of said sonotrode, one said side wall extending perpendicular to the lateral face which said one side wall intesects, the other side wall extending at an angle greater than 90° from the lateral face which said other side wall intersects with the surface between said side walls being concave.

7. Apparatus according to claim 6, wherein said other side wall extends parallel to a said lateral face.

8. Apparatus according to claim 7, wherein the structure of said other side wall is formed with alternating elevations and deepenings.

9. Apparatus according to claim 1, whereby said projection is no greater than the depth of the associated recess of said sonotrode.

10. Apparatus according to claim 1 or claim 9, wherein the portion of the anvil defining said compression chamber is made of hardened material.

11. Apparatus according to claim 1, wherein the moving direction of said anvil relative to the oscillation direction of said sonotrode is at an angle of 90°±20°.

* * * * *